United States Patent [19]
Binder et al.

[11] 3,854,994
[45] Dec. 17, 1974

[54] GAS ELECTRODES

[76] Inventors: Horst Binder, Heitzhoferstr. 6, Petterweil/Taunas; Alfons Köhling, Muhlstrasse 44, Niederhochstadt/Taunas; Wolfgang Kuhn, Ahornstr. 44, Frankfurt-Griesheim, all of Germany

[22] Filed: Aug. 23, 1973

[21] Appl. No.: 390,841

[52] U.S. Cl................ 117/216, 117/217, 117/218, 136/120 FC
[51] Int. Cl........................... B44d 1/18, B44d 1/16
[58] Field of Search..... 117/216, 217, 218, 161 UF, 117/138.8 UF, 119, 98, 226; 136/121, 122, 120 FC; 204/290 R, 294

[56] References Cited
UNITED STATES PATENTS

| | | | |
|---|---|---|---|
| 2,773,781 | 12/1956 | Rodman | 117/161 UF |
| 3,102,826 | 9/1963 | Moutaud et al. | 117/161 UF |
| 3,274,031 | 9/1966 | Maget et al. | 136/120 FC |
| 3,322,576 | 5/1967 | Young | 117/216 |
| 3,385,780 | 5/1968 | Feng | 136/120 FC |
| 3,480,538 | 11/1969 | Sturm | 136/120 FC |
| 3,522,094 | 7/1970 | Richman | 136/120 FC |
| 3,615,841 | 10/1971 | Smith et al. | 136/120 FC |
| 3,671,317 | 6/1972 | Rifkin | 117/226 |
| 3,793,085 | 2/1974 | Hino et al. | 136/120 FC |
| 3,799,811 | 3/1974 | Sampson et al. | 136/120 FC |

*Primary Examiner*—Cameron K. Weiffenbach
*Attorney, Agent, or Firm*—Philip M. Dunson

[57] ABSTRACT

A method of making a porous electrode having an electrically conductive electrocatalytically active layer and a contiguous gas permeable hydrophobic layer comprising filtering a first suspension comprising essentially polytetrafluoroethylene powder in propanol-(1), isopropanol, butanol, or dichloromethane, and withdrawing liquid therefrom to form a first porous layer comprising a matted and damp polytetrafluoroethylene filter cake, placing a second suspension comprising essentially carbon powder, graphite fibers, and polytetrafluoroethylene powder in propanol-(1), isopropanol, butanol, or dichloromethane, by withdrawing liquid therefrom through the screen and the first layer to form a second porous layer including the screen on the first layer, drying the two-layer structure, and heating it to at least about 330° C, and preferably not more than about 380° C, in a nonoxidizing atmosphere.

Each filtering typically is carried out by applying suction to each suspension through a filter medium, preferably in at least two steps with the suction rate increasing from each step to the next. The metal screen typically is made of nickel, silver, gold, platinum, or corrosion resistant steel.

19 Claims, No Drawings

GAS ELECTRODES

BACKGROUND

This invention relates to porous thin-layer gas electrodes and to methods for making them, especially for fuel cells with air-breathing electrodes and with alkaline electrolytes. More specifically, this invention relates to two-layer thin electrodes in which one layer in contact with oxygen or air is hydrophobic or nonwetted by the electrolyte so as to allow air to diffuse into contact with the electronically conducting electrocatalytic layer that is in contact with, and wetted by, the electrolyte. The hydrophobicity of the gas face of the electrode prevents flooding of it by the electrolyte thus avoiding decrease in quantity of oxygen (in the case of air-breathing electrode) or of fuel gas (for anode depolarization) reaching the reactive layer as required for efficient battery or fuel-cell performance.

The presence of catalytically active material in as thin a porous layer as possible on one side facing the electrolyte and of an extremely hydrophobic or nonwetted porous layer on the other side facing the reactive gas are critically important for the best possible performance of gas electrodes according to well known theoretical considerations. Making such electrodes has not been as successful as implied to be possible by the theoretical considerations. Furthermore, those electrodes that have been successful in the art are costly because of production technique and/or incorporation of catalysts based on noble metals. This situation is especially evident in that the heretofore high cost for porous electrocatalytically active fuel cell electrodes is a major factor in holding back the rapid expansion in use of fuel cells.

Many techniques are known for making fuel-cell porous electrodes that provide both hydrophobic, or nonwetting, sites and electrocatalytically active sites. One such method is to render the gas side of the electrode nonwetting by spraying or soaking that face of a porous electrocatalytically active foil with a nonwetting material. Whereas such as superficial layer provides for a functional gas electrode, its effective operating life is too limited for practical considerations. Alternatively, and to provide for longer useful life, a layer of a porous nonwettable material is mounted as a discrete layer on the porous electrocatalytically active foil. This is known to produce an electrode structure that effectively prevents electrolyte from flooding the face exposed to the reactive gas. Or, the porous nonwetting layer, as is known in the art, may be made simultaneously with the porous active layer. In this case, powder or a mixture of powders are pressed and sintered to produce stable porous electrodes, which, however, have relatively large surfaces and are uniform only if relatively thick; i.e., over 1 mm in thickness. Otherwise nonuniform distribution of the grains results. When the density of grains differs, the components of the active layer tend to separate. This condition, which is unfavorable for efficient performance, can be corrected by producing individual layers of porous nonwetting and of porous catalytically active layers and subsequently putting them together. However, the production process is tedious and difficult to control and thus electrodes cannot be readily mass produced because of the excessive and impratical care needed in handling and putting two ultra thin porous foils together.

Other methods known in the art start with prefabricated porous electronically conducting foils on which a more or less highly fluid catalyst suspension is applied by spraying or brushing. Here again thicker-than-desired electrodes result and adhesion of the sprayed or brushed-on layers is less than needed for long-term operation as gas electrodes. Furthermore, the spraying or brushing tends to clog individual pores, especially when pressure is used to attain bettter consolidation between layers. Clogging reduces the efficiency or power density of such electrodes.

In still other known methods, a fluorocarbon nonwetting material in suspension in a carrying liquid is more or less deeply incorporated in one face of a prefabricated porous catalyst-containing metal or carbon layer. Here again some of the pores become clogged and some pore walls are covered with impurities, which prevent full effectiveness of the catalyst to support the gas electroreaction. Furthermore, such electrodes are known in time during use to pass electrolyte as drops through the gas diffusion side of the electrode; in other words some loss of nonwettability occurs.

OBJECTS

It is an object of this invention to provide a thin porous gas electrode in which a porous nonwetting and gas permeable face is physically distinct from and durably adherent to an electronically conducting porous electrocatalytically active face.

Another object of this invention is to provide a method of making said electrode by a relatively simple procedure that is suitable for either batch or continuous production that effects two discrete layers, i.e., one a porous layer consisting of nonwetting substance and the other a porous layer consisting of electronically conducting and of electrocatalytic materials, without encroachment of either layer physically into the other.

SUMMARY

A typical method according to the present invention for making a porous electrode having an electrically conductive electrocatalytically active layer and a contiguous gas permeable hydrophobic layer comprises filtering a first suspension comprising essentially polytetrafluoroethylene powder in propanol-(1), isopropanol, butanol, or dichloromethane, and withdrawing liquid therefrom to form a first porous layer comprising a matted and damp polytetrafluoroethylene filter cake, placing a metal screen on the filter cake, filtering a second suspension comprising essentially carbon powder, graphite fibers, and polytetrafluoroethylene powder in propanol-(1), isopropanol, butanol, or dichloromethane, by withdrawing liquid therefrom through the screen and the first layer to form a second porous layer including the screen on the first layer, and heating the two-layer structure to at least about 330° C. The two-layer structure should be dried before the heating step. The suspensions preferably are in propanol-(1).

Each filtering typically is carried out by applying suction to each suspension through a filter medium, preferably in at least two steps with the suction rate increasing from each step to the next.

The metal screen typically is made of nickel, silver, gold, platinum, or corrosion resistant steel, with the mesh size being about 0.4 to 1 mm and the wire thickness about 0.08 to b 0.15 mm. Preferably the grain size of the polytetrafluoroethylene in each suspension is predominantly between 30 and 50 micrometers, and the carbon powder consists essentially of an activated carbon having a specific surface area of at least about 100 square meters per gram and a grain size of less than about 10 micrometers.s The proportion of graphite fibers in the second suspension preferably is about 5 to 20 percent by weight of the entire solids. The second suspension may comprise also lamp black, graphite powder, or both. It may further comprise activated carbon and a catalyst material such as platinum or Raney nickel.

The ratio of the polytetrafluoroethylene powder to the carbon powder of the second suspension typically is about 2:1 1 to 1:5 by weight. The second suspension may comprise additional electrically conductive material such as graphite powder or a metal powder. The amount of liquid preferably corresponds to at least about 10 times the weight of the solids in the first suspension, and at least about 20 times the weight of the solids in the second suspension. Each filtering may be carried out continuously on a tape or drum filter. The heating preferably is to about 330° to 380° C in a non-oxidizing atmosphere.

DESCRIPTION OF PREFERRED EMBODIMENTS

We have discovered that novel and improved electrodes can be made either batch wise as individual electrodes or in continuous foil form, that can be cut into individual electrodes in accordance with design needs. First, on a vacuum filtering device a suspension of polytetrafluoroethylene (PTFE) powder in propanol-(1), iso-propanol, butanol or dichloromethane, preferably propanol-(1) is poured. Liquid is extracted from the emulsion in at least two steps each at different vacuum. Then the metallic screen is applied on the resulting matted and still damp PTFE filter cake. Afterwards, using the same dispersing liquid as in the first filtering process, a second suspension consisting essentially of carbon powder, graphite fibers and polytetrafluoroethylene powder is poured on the mat while it is on the filter. From this suspension, in at least two steps also each at a different vacuum, liquid is withdrawn through the first formed layer, and finally the resulting double layer filter cake is dried in a stream of air in a furnace, and then is heated up to a temperature of about 330° to 380° C, preferably about 350° to 370° C.

As filtering device, a filter funnel with a horizontal filter plate and a fitted filter paper, or a continuous filter tape, or a drum filter covered with a dense filter cloth may be used. Especially suitable is PTFE powder, having grain size distribution such that the main part of the particles measures between about 30 and 50 micrometers, and that as little as possible of larger particles are contained. The previously mentioned organic solvents are quite appropriate as suspension liquid. Many other liquids that have been considered for use as suspension liquid foam during active stirring, and wet the PTFE particles poorly, so that they allow the first filter cake to dry too rapidly, or, when the product has dried, are too difficult to remove before the final sintering process. The amount of liquid must correspond to at least 10 times (preferably twenty times) the weight of the amount of solid. The liquid and the PTFE powder are agitated with a rapid stirrer actively for a few minutes up to the moment of pouring onto the filter.

To produce the desired porous structure, the amount of liquid and the speed of suction must be correlated so that the suspended particles have time to settle (up to a few minutes) before the main amount of the supernatant liquid is drawn off through the filter. Then the suction rate is increased so that the PTFE layer is compressed and rapidly gives up the majority of the liquid still retained. The degree of vacuum is determined by the permeability of the filter layer.

A wire gauze next is placed on the still damp PTFE layer. The wire gauze can have the shape of the desired electrode (circular, rectangular, polygonal), or can be a continuous length laid on the filter tape, for later cutting to the shape desired. The thickness of the wire gauze or netting and its mesh aperture are determined by the current density in use and by the material of the wire. This material, in its turn, must be chosen according to its use (acid or alkaline electrolyte; anode or cathode; fuel). Preferably the metal or wire gauze is Ni, Ag, Au, Pt or of corrosion resistant steel with wire gauges of a few tenths of a millimeter, and with the largest mesh apertures to be obtained according to the wire gauge. Meshes that are too small render the cohesion of the electrode layers difficult.

The next step consists in the application of the active layer suspension, which, in the same liquid as the first suspension, contains the electrode catalyst in addition to PTFE powder. This catalyst consists preferably of surface rich, electrically conducting activated carbon on which, through any method, another catalytically active material can be applied. Furthermore, the suspension must contain a certain proportion of fibrous components so that the filter cake becomes suitably matted and resistant to tearing. To enhance the strength and electrical conductivity, graphite fibers or commercial graphitic felt are added in an amount, for instance, of about 5 to 20 weight percent, preferably about 5 to 10 percent, of the total amount of solid of the suspension. For the sedimentation properties of the suspension, and for the pore structure to be obtained, finely divided lamp black is added in about the same amount by weight as the activated carbon. In order to increase the conductivity of the active layer, graphite powder or metallic powder may be added.

The mixing proporations of the components of the active layer vary according to the intended use. The PTFE amount is about 30 to 50, preferably about 40 percent, of the total solid content of the suspension.

The amount of liquid here is about 20 to 50 times the solid weight, and preferably about 40 times. This suspension is activily stirred until it is carefully transferred without splash or disturbance to the PTFE layer covered with the gauze. At the beginning of the transfer suction is applied for low filter rate. This causes separation of the solid particles according to grain sizes, as the heavier particles settle out first and the fine particles remain suspended longer in the liquid. Thus they cannot be washed into the PTFE layer, which importantly would impair hydrophobicity. It is only when the initial coarse particle layer has formed and when a pair of the liquid has flowed through, that the very fine particles are retained more firmly in the active layer. At the same time at the electrolyte side of the electrode, especially fine pores are formed, as is desired in order to prevent the penetration of gas from displacing electrolyte that enters the fine pores due to capillary action.

Toward the end of the filtering process, which lasts several minutes, filter rate at the reduced pressure (as in the fabrication of the PTFE layer) is increased, and finally, for a rather long time period, air is sucked through the two layers. Residual moisture is removed in a drying chamber or in the entrance area of a sintering furnace at about 80° to 100° C. The crude electrode as the now double layer filter cake is either carefully cut and sintered piece by piece, or is led as a tape through a sintering furnace, and then is cut up. From 330° to 380° C is required as sintering temperature for the PTFE. For most of the catalysts used, and also for pure carbon catalysts, it is advantageous to sinter in inert gas or in reducing atmosphere, for example in hydrogen.

Transposition of the formation steps in making the electrode, such as first laying down the active layer, then applying the PTFE back layer in the corresponding way, is possible, but leads to an inferior electrode. This is because during the application of the PTFE suspension the last deposited fine portion of catalyst particles near always are washed away from the carbon containing layer and are forced into the PTFE layer. Furthermore, the pore structure of the active layer is such that the finest grains or particles and thus the finest pores are oriented to the gas face, which is disadvantageous.

Other characteristics, advantages and possibilities of utilization of the invention can be derived from the following examples.

EXAMPLE 1

One gram of PTFE (Hostaflon TF 17, Hoechst) was suspended in 30 ml propanol-(1) with the help of a high-speed blender and then was filtered through a fine paper filter (analytic filter "Blauband") in a carefully horizontally placed porecelain funnel suction filter 90 mm in diameter, as described above. A metallic gauze or screen made of Ag wire (wire thickness 0.12 mm; 219 meshes per cm$^2$), cut to the same diameter as the funnel was placed on the PTFE cake.

To make the catalytically active layer,
120 mg of activated carbon,, grain size less than 1 micrometer
170 mg of lamp black
50 mg of graphite fibers, and
220 mg of PTFE powder (as above)
were suspended in the same way in 35 ml of propanol-(1) and were carefully poured on the metal screen, without any vacuum. In the way described, suction was started slowly at first, then rapidly. Next, the filter cake with the paper filter was placed in a drying chamber and dried at 80° C for 2 hours. After this drying the entire electrode layer was easily removed from the paper and transferred onto an aluminum foil. Then, the double-layer filter cake, between Al foils, was heated in a sintering furnace under hydrogen to 380° C and sintered for 2 hours. After cooling, the electrode was ready for measurement of electroactivity. It possessed a pure white PTFE back and was uniformly 0.4 mm thick.

In a half cell arrangement, the following potentials were measured against a hydrogen electrode in 6.5 N KOH at 50° C:

|  | with Oxygen | with Air |
|---|---|---|
| Equilibrium rest potential | 960 mV | 960 mV |
| at 50 mA/cm$^2$ | 780 mV | 750 mV |
| at 100 mA/cm$^2$ | 750 mV | 720 mV |

The oxygen or air was conveyed to the back of the electrode under atmospheric pressure. The measuring values remained unchanged for more than 1,000 hours. No drops of liquid were evident on the PTFE layer.

The low potential difference between the measurements with oxygen and those with air is especially remarkable and proves that oxygen diffusion was essentially uninhibited even when air was used, so that the back layer possesses an extremely favorable pore structure, as is not exhibited by porous electrodes commonly obtainable on the market. Such performance is heretofore unattained with electrodes known in the art.

EXAMPLE 2

The excellence of performance of porous electrodes made by the present technique in fuel cells is shown by this example. Sixty to 80 mW/cm$^2$ (of electrode geometric surface) of power output was obtained at 60° to 90° C in a fuel cell using 3N to 10N potassium hydroxide electrolyte and electrodes made as follows according to the novel procedure of this invention.

The electrocatalytic layer of the anode contained 50 mg/cm$^2$ or Raney nickel in a matrix of polyethylene and a nickel wire gauze electric current collector with the gas side being a porous layer of PTFE and total thickness of about 0.7 mm.

The air-breathing cathode contained 10 mg/cm$^2$ of catalyzed active carbon and a nickel wire gauze in the active layer with the porous gas-face layer being PTFE.

Single electrodes have operated at 100 mA/cm$^2$ for more than 2,000 hours.

The following electrodes are typical for a great number of similar items:

EXAMPLE 3

Typical electrode with nickel wire gauze, mesh size 1.5 mm, wire diameter 0.25 m, resistivity of 0.8 ohm per square. Composition of mixtures and procedure identical to Example 1. Total thickness of electrode 0.5 mm: Open circuit potential 960 mV, at 100 ma per sq cm in oxygen 685 mV, in air 630 mV.

EXAMPLE 4

Typical electrode with stainless steel gauze, mesh size 0.6 mm, wire diameter 0.2 mm, resistivity 0.8 ohm per square. Composition of mixtures and procedure identical to Example 1. Total thickness of electrode 0.5 mm: Open circuit potential 950 mV, at 100 ma per sq cm in oxygen 680 mV, in air 640 mV.

EXAMPLE 5

Typical electrode with addition of nickel powder. Scale of electrode: 48 mm diameter, wire gauze, nickel as in Example 3, resistivity less than 0.1 ohm per square. Composition of active mixture: Active carbon 130 mg, PTFE 120 mg, Nickel powder 750 mg. PTFE layer and procedure according to Example 1, total thickness of electrode 1.0 mm: Open circuit potential 970 mV, at 100 ma per sq cm in oxygen 600 mV.

EXAMPLE 6

Typical electrode with addition of electrically conductive material nickel boride, resistivity 1.1 ohms per square. Scale of electrode: 48 mm diameter, wire gauze, nickel as in Example 3. Composition of active mixture: Active carbon 250 mg, PTFE 150 mg, Carbon black 170 mg, Nickel boride 450 mg formula Ni 483, Grain size less than 85 microns, PTFE layer and procedure according to Example 1, total thickness of electrode 1.5 mm: Open circuit potential 965 mV, at 100 ma per sq. cm in oxygen 700 mV.

EXAMPLE 7

Typical electrode with gold wire gauze, mesh size 0.25 mm, wire diameter 0.08 mm: Scale of electrode: 48 mm diameter, catalyst: Active carbon, impregnated with 10 wt percent Pt, as for sale from many firms. Composition of active mixture: Impregnated carbon 180 mg, (I.E. Platinum 18 mg), PTFE 290 mg, Carbon black 72 mg, Graphite felt 72 mg, Graphite felt 72 mg, Graphite powder 108 g. PTFE layer and procedure according to Example 1, total thickness 1.0 mm. Open circuit potential hydrogen 0 mV, at 100 ma per sq. cm 50 mV. Open circuit potential oxygen 790 mV, at 100 ma per sq cm 690 mV, in air 620 mV.

All potentials were measured in 6.5 N KOH at 50° C versus hydrogen electrode, same electrolyte. Electrodes containing no precious metal catalysts work only in alkaline electrolyte. For acid electrolyte, i.e., 3 N sulfuric acid, electrodes containing platinum worked as anodes and as cathodes.

Description of substances:

Graphite Powder: Type 219 C, Schunck und Ebe, Giessen, Grain size about 100 micrometers PTFE: Hostaflon TF 17, Trade mark, Farbwerke Hoeschst, grain size given as 30 to 50 micrometers thickness of PTFE layer about 0.2 mm when made according to given example.

Active Carbon: Type BRX, Norit Comp., Amsterdam, grain size about 1 micrometer. For active carbon great surface area is necessary, e.g. more than 100 sqm per gram.

Carbon Black: Corax, trade mark, Degussa Hanau, grain size about 0.03 micrometer.

Graphite Felt: Type RVG, DT. Carbone ag, Frankfurt, Fibres 4 to 8 micrometer.

Nickel: Mond Nickel, Internat. Nickel Comp., grain size less than 60 micrometers.

Nickel Boride: Laboratory preparation, grain size less than 60 micrometers.

Graphite fiber or other graphite may be used from standpoint of conductivity, fibers are preferable for forming paper sheet. Composition, layer thickness, and gauze size can be varied in broad ranges. Preferred ranges of composition: plus or minus 20 percent of given values.

Preferred range of back layer thickness: 0.1 to 1 mm depending on grain size of PTFE, active layer: As thin as possible with needed catalyst amount. Layer thickness depends on wire mesh dimensions, too.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

We claim:

1. A method of making a porous electrode having an electrically conductive electrocatalytically active layer and a contiguous gas permeable hydrophobic layer comprising
    filtering a first suspension comprising essentially polytetrafluoroethylene powder in propanol-(1), isopropanol, butanol, or dichloromethane, and withdrawing liquid therefrom to form a first porous layer comprising a matted and damp polytetrafluoroethylene filter cake,
    placing a metal screen on the filter cake,
    filtering a second suspension comprising essentially carbon powder, graphite fibers, and polytetrafluoroethylene powder in propanol-(1), isopropanol, butanol, or dichloromethane, by withdrawing liquid therefrom through the screen and the first layer to form a second porous layer on said screen and said first layer, and
    heating the two-layer structure to at least about 330° C.

2. A method as in claim 1, wherein the two-layer structure is dried before the heating step.

3. A method as in claim 1, wherein the suspensions are in propanol-(1).

4. A method as in claim 1, wherein each filtering is carried out in at least two steps.

5. A method as in claim 1, wherein the metal screen is made of nickel, silver, gold, platinum, or corrosion resistant steel.

6. A method as in claim 1, wherein the mesh size of the metal screen is about 0.4 to 1 mm and the wire thickness is about 0.08 to 0.15 mm.

7. A method as in claim 1, wherein the grain size of the polytetrafluoroethylene in each suspension is predominantly between 30 and 50 micrometers.

8. A method as in claim 1, wherein the carbon powder consists essentially of an activated carbon having a specific surface area of at least about 100 square meters per gram and a grain size of less than about 10 micrometers.

9. A method as in claim 1, wherein the proportion of graphite fibers in the second suspension is about 5 to 20 percent by weight of the entire solids.

10. A method as in claim 1, wherein the ratio of the polytetrafluoroethylene powder to the carbon powder of the second suspension is about 2:1 to 1:5 by weight.

11. A method as in claim 1, wherein said second suspension contains an additional electrically conductive material selected from the group consisting of graphite powder and metal powder.

12. A method as in claim 1, wherein the amount of liquid corresponds to at least about 10 times the weight of the solids in the first suspension, and at least about 20 times the weight of the solids in the second suspension.

13. A method as in claim 1, wherein each filtering is carried out continuously on a tape or drum filter.

14. A method as in claim 1, wherein the heating is to about 330° to 380° C in a nonoxidizing atmosphere.

15. A method as in claim 1, wherein each filtering is carried out by applying suction to each suspension through a filter medium.

16. A method as in claim 15, wherein each filtering is carried out in at least two steps with the suction rate increasing from each step to the next.

17. A method as in claim 1, wherein said second suspension also includes a material selected from the group consisting of lamp black, graphite powder, and a mixture thereof.

18. A method as in claim 17, wherein said second suspension includes activated carbon and a catalyst material.

19. A method as in claim 18, wherein the catalyst material is platinum or Raney nickle.

* * * * *